UNITED STATES PATENT OFFICE.

JARVIS B. EDSON, OF ADAMS, MASSACHUSETTS.

MANUFACTURE OF ARTIFICIAL IVORY.

SPECIFICATION forming part of Letters Patent No. 283,225, dated August 14, 1883.

Application filed April 28, 1883. (Specimens.)

*To all whom it may concern:*

Be it known that I, JARVIS B. EDSON, of the town of Adams, in the county of Berkshire and State of Massachusetts, have invented new and useful Improvements in the Manufacture of Artificial Ivory from Zylonite or a Cellulose Compound, of which the following is a specification.

This invention pertains to the production of an article which closely resembles and is adapted for being used as a proper substitute for ivory; and the invention consists in forming a composition chiefly of such substances as zylonite or those elements which are formed chiefly of pyroxyline, and a new article is produced by forming the zylonite or its equivalent substance of different densities, and in some cases of slight differences in color, and then cutting the same into sheets, as by any of the well-known processes for such manufacture, and then combining them in the said sheet form, as by rolling them or pressing them together under great pressure, so as to compact the several sheets into one entire mass, but in such a manner as to preserve the peculiar characteristics of the structure of each separate sheet, and at the same time make such a compact body as that when cut into thin sheets the various sections in the said sheets will show the different characteristics or grain of the original sheets of which the mass was composed, and thereby imitate the various growths or laminated character of the ivory.

It is evident that this composition and combination may be made of various materials and in various ways; but

I claim—

1. The method of forming artificial ivory or a substitute for ivory by, first, forming the material for the several growths or layers of zylonite or similar substance in different densities or different characteristics of composition; second, cutting the same into sheets and then compressing the several sheets of all the elements into one entire mass; and, third, making into sections the several layers, as by the process of cutting, for producing the sheets to imitate ivory, as hereinafter set forth.

2. An artificial ivory or substitute for ivory, formed of zylonite or similar compound, the basis of which is pyroxyline, so as to resemble ivory, substantially as described.

In witness whereof I have hereunto subscribed my name and affixed my seal in the presence of two subscribing witnesses.

JARVIS B. EDSON. [L. S.]

Witnesses:
EUGENE N. ELIOT,
HARRY EDWARDS.